United States Patent
Seale, III et al.

(10) Patent No.: US 7,711,641 B1
(45) Date of Patent: May 4, 2010

(54) METHOD AND SYSTEM FOR AN INTER-FINANCIAL INSTITUTION TRANSACTIONAL NETWORK

(75) Inventors: Robert Henry Seale, III, Dripping Springs, TX (US); Anthony M. Flagg, Austin, TX (US); James C. Clay, Cedar Park, TX (US); Adam D. Anderson, Austin, TX (US)

(73) Assignee: Q2 Software, Inc., Austin, TX (US)

( * ) Notice: Subject to any disclaimer, the term of this patent is extended or adjusted under 35 U.S.C. 154(b) by 149 days.

(21) Appl. No.: 11/872,914

(22) Filed: Oct. 16, 2007

Related U.S. Application Data

(60) Provisional application No. 60/852,038, filed on Oct. 16, 2006.

(51) Int. Cl.
*G06Q 40/00* (2006.01)
(52) U.S. Cl. .............................. 705/39; 705/35; 705/40; 705/42; 705/44
(58) Field of Classification Search .................. 705/35, 705/39, 40, 42, 44
See application file for complete search history.

(56) References Cited

U.S. PATENT DOCUMENTS

| | | | |
|---|---|---|---|
| 7,146,338 B2 * | 12/2006 | Kight et al. | 705/42 |
| 7,383,223 B1 * | 6/2008 | Dilip et al. | 705/39 |
| 2001/0034682 A1 * | 10/2001 | Knight et al. | 705/35 |
| 2003/0236728 A1 * | 12/2003 | Sunderji et al. | 705/35 |
| 2006/0015450 A1 * | 1/2006 | Guck et al. | 705/39 |
| 2007/0100748 A1 * | 5/2007 | Dheer et al. | 705/39 |

* cited by examiner

*Primary Examiner*—James P Trammell
*Assistant Examiner*—Shahid R Merchant
(74) *Attorney, Agent, or Firm*—Sprinkle IP Law Group

(57) ABSTRACT

Systems and methods for conducting transactions across financial institutions are presented. More specifically, in one embodiment a financial transaction center may be provided such that transactions may be coordinated and controlled utilizing the financial transaction center. The financial transaction center may determine a financial institution associated received requests and issue requests to financial institutions. By coordinating the fulfillment of transactions between financial institutions through the financial transaction center a level of abstraction may be introduced whereby transactions may be conducted across financial intuitions without knowledge of host systems at the financial institutions or overly compromising the privacy or security of these host systems.

20 Claims, 5 Drawing Sheets

METHOD AND SYSTEM FOR AN INTER-FINANCIAL INSTITUTION TRANSACTIONAL NETWORK

RELATED APPLICATIONS

This application claims a benefit of priority to the filing date of U.S. Provisional Patent Application Ser. No. 60/852,038 by Robert Henry Seale, III, Anthony M. Flagg, James C. Clay and Adam D. Anderson, entitled "An Inter-Bank Transactional Network System and Method and Secure System for Distributed Financial Data Access and Transactions Using Direct Access to Systems of Record Over a Network" filed on Oct. 16, 2006, the entire contents of which are hereby expressly incorporated by reference for all purposes.

TECHNICAL FIELD

This invention relates generally to the field of conducting financial transactions utilizing a network and more specifically to the field of conducting transactions between financial institutions utilizing communication networks for interoperability. One particular embodiment of this invention relates to the field to the field of automating account inquiries and other transactions between financial institutions to expand current services and improve operational efficiencies.

BACKGROUND

The data processing platforms utilized by financial institutions to manage or otherwise process user accounts and associated information of transactions pertaining to these accounts have been developed over a number of years and may have a correspondingly long lifespan. These data processing systems may offer a certain range of functionality, however, in many cases these legacy systems are incompatible with one another. Consequently, at present, financial institutions are not easily or directly able to view data or conduct transactions between themselves, as different financial intuitions may utilize different types of data processing platforms. This limitation may severely limit the value financial institutions can create for their customers and may adversely impact their own operating efficiencies as well.

More specifically this limitation may prevent or hinder the ability of a financial institution to conduct transactions (e.g. viewing account information, moving funds between accounts, withdrawing or transferring funds from an account, etc.) in conjunction with other financial institutions. These types of transactions include bringing together a user's accounts from different financial institutions into a single view. Currently this capability is limited to screen capture-style inquiry only and may require the knowledge of a user's password at each individual financial institution at which a user holds an account. It would be extremely valuable for financial institutions to offer to their customers the ability to operate on all of their accounts from different institutions simultaneously and perform transactions between or among these accounts them. Additionally, when conducting a transaction at one financial institution with respect to an account at another financial institution such as the cashing of a check or the transfer of funds a financial institution can either hold the funds and wait for the funds to settle, which is inconvenient for the customer, or it can assume risk in making the funds available to the customer before it gets paid.

Incompatibility between host systems at financial institutions may also cause problems for the management of multiple financial institutions in tandem. For example, where a financial institution acquires another institution and thus needs some level of dual financial institution reporting and visibility the incompatibility of host systems at the respective financial institutions may be problematic.

Existing methods for conducting inter-financial institution transactions are severely limited in that they typically rely on manual modes of communication, such as telephone, to verify the existence of and availability of funds across institutions or they rely on screen scraping methods which provide only static, non-actionable data. Or temporary information that can change before the information is acted on, thus increasing risk to the financial institution. Additionally, manual settlement may be required in conjunction with these methods in order to reduce risk for the financial institution. This requirement may consequently reduce the intended benefit to the consumer and does not provide the financial institution or end users with a mechanism for executing transactions through online applications. Furthermore, these types of transactions may be limited in scope, such that only a highly specialized slice of financial data is reviewable, and that slice, as mentioned above, may be non-actionable.

Thus there is a need for efficient systems and methods for coordinating and conducting transactions between and among financial institutions.

SUMMARY

Systems and methods for conducting transactions across financial institutions including issuing, tracking, viewing or otherwise managing such transactions are presented herein. More specifically, in one embodiment a financial transaction center may be provided such that transactions may be coordinated and controlled utilizing the financial transaction center. Specifically, in one embodiment the financial transaction center may receive an initial request for an operation from an initiating financial institution. The financial transaction center may determine a financial institution associated with the received request and one or more requests to issue to the associated financial institution based upon the operation associated with the request. The financial transaction center may then issue these requests to the financial institution which fulfills these requests and returns any results to the financial transaction center. The financial transaction center may, in turn, formulate a response to the initial request using these responses and send these responses back to the initiating financial institution such that a transaction may be completed.

By coordinating the fulfillment of transactions between financial institutions through the financial transaction center a level of abstraction may be introduced whereby transactions may be conducted across financial intuitions without knowledge of host systems at the financial institutions or overly compromising the privacy or security of these host systems. More particularly, a set of interfaces may be used to issue requests to the financial transaction center and the financial institutions, where the set of interfaces may be generic across financial institutions. Thus, if a transaction is initiated at a financial institution, where the transaction involves both accounts at the financial institution and accounts remote from the financial institution any operations on the local accounts corresponding to the transaction may be conducted by that financial institution while any operations on any remote accounts may be accomplished by issuing requests for such operations to the financial transaction center, which may in turn request the desired operations on the remote accounts using the set of interfaces provided by the financial institutions that hold those accounts.

While it will be understood that it may be possible to conduct transactions directly between financial institutions utilizing the set of interfaces provided by each financial institutions, the use of a financial transaction center may provide a number of advantages in certain contexts, especially with respect to security and network efficiency. As requests for operations on remote accounts may be conducted though the financial transaction center, each financial institution may only have to be communicate with the financial transaction center, as opposed to each financial institution having to communicate with all other financial institutions. Thus, the parameters of a communication network utilized for cross financial institution transactions may be simpler, as each financial institution may only be coupled to the financial transaction center. Additionally security may be better provided with respect to these cross financial institution transactions as only communications between a financial institution and the financial transaction center may be encrypted, verified or authenticated, as opposed to implementing security with respect to communications among and between all financial institutions.

In one embodiment, these systems and methods may utilize a secure network using a VPN architecture operated over the public Internet to allow each participating financial institution to interact with applications at the financial transaction center; one or more user applications, which can be located at the customer site or in the financial transaction center that provide interactive functionality allowing customers and financial institution employees to issue, track, view or manage transactions that can be fulfilled across institutional boundaries using the secure network; an application at a financial transaction center datacenter that receives and issues requests directly to and from the financial institutions that contain the data for the involved accounts. This application may abstract the different systems of record from each other, but allow them to securely interoperate across the secure network. Other services, such as directory services, security and authentication services, web services and others may also support the delivery of the transaction processing capabilities.

Therefore certain embodiments of the systems and methods presented may allow customers and financial institutions (e.g., banks) to view data over networks (e.g., the Internet) across institutional boundaries in an efficient, non-artificial manner. Therefore, these institutions can issue transactions from networked applications (e.g., internet-available applications) that provide aggregated views. As a result, financial Institutions and their customers have functionality and service that they can exercise and offer over networks. Thus, embodiments of these network-based systems and methods for conducting transaction across financial institutions can: 1) provide end users with a mechanism for executing transactions, 2) hide the underlying account structure from the end users, 3) provide a platform for financial institutions to clear transactions or move funds in response to customer requests via an online banking application and 4) aggregate the view of the data with an interactive display.

Certain embodiments may therefore also provide the advantages of allowing financial institutions to make funds available to its customers and customers of other financial institutions while at the same time reducing risk of fraud or incurring "NSF" (insufficient funds fees) due to the ability of being able to see funds availability across the network, as well as hold funds to ensure repayment; creating a secure, encrypted network in which financial institutions can collaborate in an organized, automated fashion, where security can be provided through the tunnel encrypted virtual private network in which only designated IP addresses may gain access and in which all data traveling is encrypted and create the ability for multiple banks (such as in a holding company) to manage multiple institutions without having to have consolidated back end systems.

In particular customers of financial institutions can maintain an existing relationship with that financial institution even if the customer moves away from any main or branch location of that financial institution. This not only saves time and resources involved with finding an establishing new accounts, etc, but it allows the consumer to enjoy long term continuity with one financial institution which can increase the likelihood of receiving credit for personal or business need and provide a network in which more ATM machines can be used by the end user without incurring fees and which funds can be available faster for cashing or deposit.

Similarly, financial institutions may be provided the advantages of having the ability to extend services to its customers beyond the traditional limits of its branches. Consequently, this ability may allow smaller financial institutions to be more competitive with nationally chartered, large financial institutions which often offer more locations by allowing these financial institutions visibility into market expanding opportunities, such as lending and deposit participations between financial institutions. Financial institutions may also have the ability to clear electronic cash letters (e.g. check images resulting from Check 21 legislation) with no per items fees with other financial institutions. This ability reduces operating costs for the financial institution Furthermore, by providing real-time interoperability between multiple disparate financial institutions, new or additional network-based services can be provided by the financial institutions to their customers. Additionally, the use of methods based on direct access to financial institutions may provide much greater functionality and depth of capability including for example the following: deposit participation in which customers with large balances or accounts across multiple institutions may be able to view, transact against, transfer to and from and generally manage a group of accounts at several different institutions as if they were a single account and local transaction clearinghouse functionality where transactions that would normally be fulfilled via a "public" payments network can be first cleared via the private, secure transaction network, eliminating the need to go outside the network and incur cost in using the public services.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Figure 1:
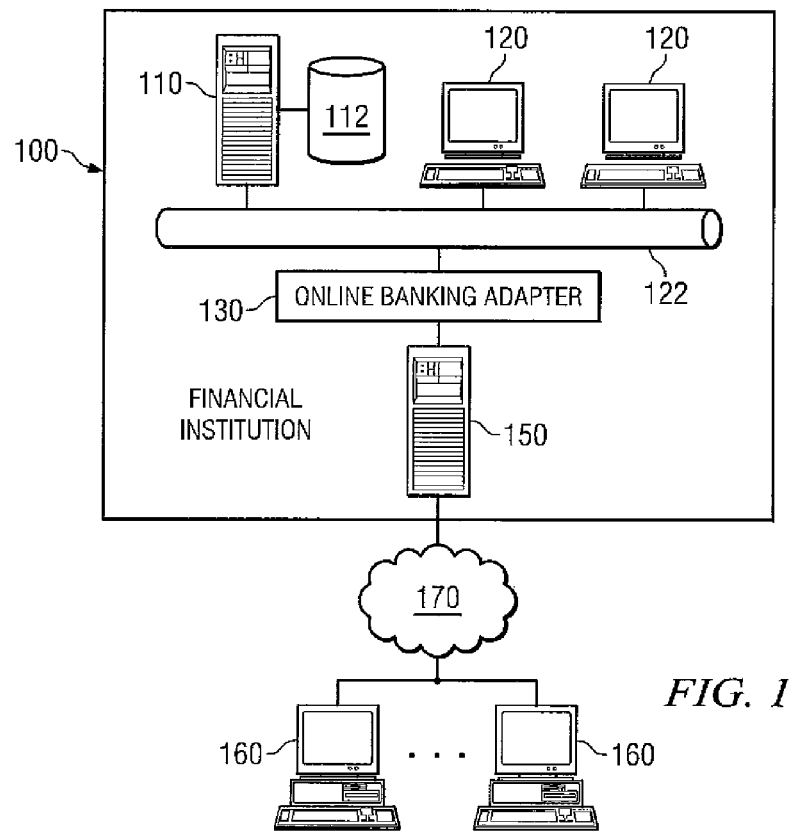
FIG. 1 is a block diagram illustrating one embodiment of a financial institution.

In describing embodiments of the systems and methods of the present invention, it may first be helpful to go over embodiments of systems and methods for conducting transactions at a financial institution using an example of a platform like those that are typically utilized in conjunction with such financial institutions. FIG. 1 is a block diagram illustrating an embodiment of just such an architecture for conducting transactions at a financial institution. Financial institution 100, which may be a bank or the like, may have a host data management system 110 for managing data associated with the financial institution 100 and conducting transactions in association with this data. In particular, this data may include data on various accounts held with financial institution 100 which may be stored in data store 112 and the transactions may include a variety of account operations which a user may desire to be performed, including such things as displaying account information, transfer of funds between accounts, opening or closing accounts or almost any manipulation of accounts or funds associated with accounts that is desired.

Host system 110 may operate according to a variety of platforms including UNISYS, AS/400, etc. and may interact with one or more software applications (e.g. computer executable instructions on a computer readable medium) to perform the transactions in conjunction with data in data store 112. These software applications may execute all or in part on host system 110 or terminals 120 at the financial institution 100 (or otherwise in communication with host system 110 through a communication network 122) such that users (e.g. bank tellers) at terminals 120 may perform a variety of transactions in conjunction with host system 110 and the associated data in data store 112.

Financial institution 100 may also desire to allow account holders to perform transactions in conjunction with their various accounts and may thus provide the ability to conduct online banking transactions via one or more interfaces. These interfaces may be provided by web server 150 to one or more users at computing devices 160 over a communication network 170 such as the Internet, a Local Area Network (LAN), a Wide Area Network (WAN) or another type of wired or wireless communication link. These interfaces may, for example, include a graphical user interface (GUI), a command line interface, or one or more web pages which may be accessed through a web browser. These web pages may for example be in HTML or XHTML format, and may provide the ability for a user to conduct transactions in conjunction with accounts which he is associated.

However, as host system 110 may be designed to interact or interface with a particular software application or messaging format, such as those utilized in conjunction with terminal 120, in order to actually conduct these transactions the interfaces provided by web server 150 may interact directly or indirectly (e.g. through one or more other software applications such as Common Gateway Interfaces, Perl scripts, Java applications, etc.) with online banking adapter 130. Online banking adapter 130 may be operable to interact with host system 110 to implement the requested transactions, for example, by emulating those software applications utilized in conjunction with terminals 120. Thus, a user may interact with one or more interfaces provided by web server 150 over network 170. These interfaces, or applications associated with these interfaces, may, in turn, utilize online banking adapter 130 to conduct the transactions specified by the user in conjunction with host system 110.

It will be apparent, however, that often times it may be desired to conduct transactions involving multiple financial institutions. Users may hold accounts at various financial institutions and wish to manage these accounts in conjunction with one another including the transfer funds between accounts at different financial institutions for a variety of reasons, for example to withdraw funds from an account at one financial institution at another financial institution, etc. The type of architecture described may, however, present a variety of impediments to such cross financial institution transaction. First and foremost, the software application operating on, or interfacing with, a host system that is utilized to perform transactions may be proprietary to financial institution 100. Exacerbating this problem, host systems at different financial institutions may operate on different platforms. Consequently conducting transactions between different financial institutions may be difficult and enabling such transactions may involve knowledge of the host systems at both financial institutions, access information for both these accounts and a great deal of manual coordination. Furthermore, security concerns may predispose financial institutions against opening up access to their host systems to outside users or applications.

As a result cross financial institution transactions may be manually intensive and insecure, as the transaction must be specifically tailored for the host systems of the participating financial institutions and necessitate knowledge of the security information pertaining to the accounts at each financial institution and access to each financial institution. This type of solution may additionally be problematic as it is not portable and thus may be specific only to the two financial institutions involved. One possible remedy to these problems is to ensure that host systems at each financial institution are compatible with one another and enable interoperability between them. This solution is, however, neither feasible nor practical in a real-world application as many of these host systems are expensive and have life cycles of anywhere between 10 and 40 years. What is desired then is simpler and more effective way to enable transactions to be conducted across financial institutions which enables these transactions to be conducted between any two financial institutions in a secure manner irrespective of the type of host systems associated with those institutions.

To that end, attention is now directed to systems and methods for issuing, tracking, viewing or otherwise managing transactions conducted across financial institutions. More specifically, in one embodiment a financial transaction center may be provided such that transactions may be coordinated and controlled utilizing the financial transaction center. Specifically, in one embodiment the financial transaction center may receive an initial request for an operation from an initiating financial institution. The financial transaction center may determine a financial institution associated with the received request and one or more requests to issue to the associated financial institution based upon the operation associated with the request. The financial transaction center may then issue these requests to the financial institution which fulfills these requests and returns any results to the financial transaction center. The financial transaction center may, in turn, formulate a response to the initial request using these responses and send these responses back to the initiating financial institution such that a transaction may be completed.

By coordinating the fulfillment of transactions between financial institutions through the financial transaction center a level of abstraction may be introduced whereby transactions may be conducted across financial intuitions without knowledge of host systems at the financial institutions or overly compromising the privacy or security of these host systems. More particularly, a set of interfaces may be used to issue requests to the financial transaction center and the financial institutions, where the set of interfaces may be generic across financial institutions. Thus, if a transaction is initiated at a financial institution, where the transaction involves both accounts at the financial institution and accounts remote from the financial institution any operations on the local accounts corresponding to the transaction may be conducted by that financial institution while any operations on any remote accounts may be accomplished by issuing requests for such operations to the financial transaction center, which may in turn request the desired operations on the remote accounts using the set of interfaces provided by the financial institutions that hold those accounts.

While it will be understood that it may be possible to conduct transactions directly between financial institutions utilizing the set of interfaces provided by each financial institutions, the use of a financial transaction center may provide a number of advantages in certain contexts, especially with respect to security and network efficiency. As requests for operations on remote accounts may be conducted though the financial transaction center, each financial institution may only have to be communicate with the financial transaction center, as opposed to each financial institution having to communicate with all other financial institutions. Thus, the parameters of a communication network utilized for cross financial institution transactions may be simpler, as each financial institution may only be coupled to the financial transaction center. Additionally security may be better provided with respect to these cross financial institution transactions as only communications between a financial institution and the financial transaction center may be encrypted, verified or authenticated, as opposed to implementing security with respect to communications among and between all financial institutions.

Figure 2:
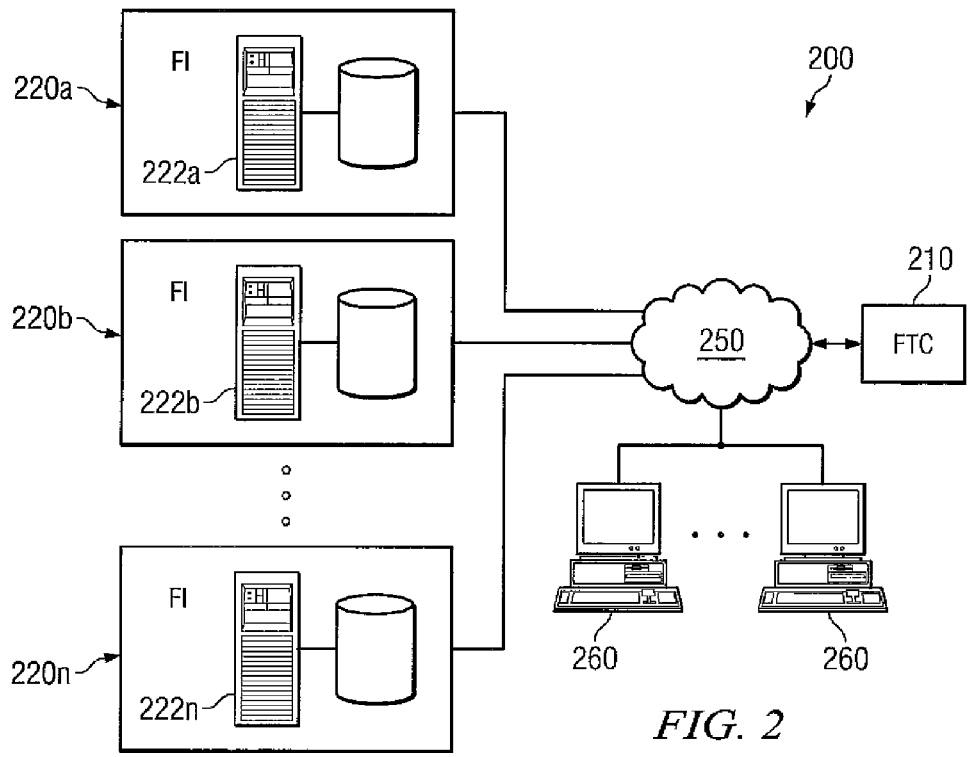
FIG. 2 is a block diagram illustrating one embodiment of a financial transaction system.

Turning now to FIG. 2, a block diagram of one embodiment of just such a financial transaction system 200 is depicted. The financial transaction system may include a financial transaction center (FTC) 210 and one or more financial institutions 220 with associated host systems 222. The FTC 210 of the financial transaction system 200 may be located at a central location and the financial institutions 210 may be located remotely from the FTC 210 and may be connected to the FTC 210 by, for example, a wired or wireless communication link 250, such as the Internet. Computing devices 260 may also be coupled to FTC 210 or financial institutions 200 via the same or a different communications link, such that users at these computing devices may interact with one or more software applications at FTC 210 or financial institutions 200 utilizing interfaces provided by these software applications.

In one embodiment this communication link (e.g. between FTC 210 and a financial institution 220, between FTC 210 and a computing device 260, between financial institution and a computing device 260, etc.) may utilize a virtual private network (VPN) architecture to secure communications traveling over this link and such communications over the link may be encrypted in some manner allowing communications between financial institutions to be verified, authenticated, decrypted, etc. by the recipient of such communications. In general, any methodology for securing or encrypting the communications link or communications over this link known in the art (e.g. public key infrastructure utilizing public keys, private keys or both) may be utilized in conjunction with the communications link(s) of financial transaction system 200.

Utilizing the described communications link(s) financial institutions 220 may provide the ability for a user at a computing device 260 to conduct transactions with respect to financial institutions 220. In particular, one or more software applications executing in conjunction with a computing device at financial institution 220 may have the ability to receive a transaction request specifying that a transaction be performed with respect to one or more accounts. It may then be determined what are the operations that need to be performed on the corresponding accounts in order to effectuate the requested transaction and whether the accounts are local to the financial institution or are located at a remote financial institution. The operations associated with that transaction may then be performed. For any operations which correspond to accounts at remote financial institutions a request may be made to the FTC 210 where the request corresponds to the operation to performed on that account. Each financial institution 220 may also comprise one or more software applications operable to receive and process requests for certain operations from FTC 210 such that the operation may be performed with respect to an account whose information is stored on a host system associated with the financial institution 220.

To facilitate these transactions, FTC 210 may provide an interface between financial institutions 220 such that the transactions may be carried out in conjunction with multiple financial institutions 220. More particularly, FTC 210 may receive issue and process requests associated with these transactions to facilitate the processing of the transaction itself. In particular, FTC 210 may be operable to receive an initial request for an operation from a financial institutions 220, determine one or more requests to issue to another financial institution 220 based upon the initial request, issue these requests to the second financial institution(s) receive any response from these second financial institutions and formulate a response to the original request.

By standardizing the interfaces utilized to issue requests to the FTC 210 and each of the financial institutions 220, transactions may be conducted across financial institutions 220 regardless of the host system utilized in conjunction with a particular financial institution participating in the transaction. In other words, requests made to FTC 210 may be made utilizing an interface exposed by the FTC 210 such that all financial intuitions 220 may utilize the same interface to make the same type of request and each financial institution 220 may present the same interface for requests such that requests for a particular type of operation from the FTC 210 to any financial institution 220 are of the same format.

In one embodiment, the standardization of such interfaces may be achieved using a web services architecture. Web services provide a standard means of interoperating between software applications running on a variety of platforms and/or frameworks. Thus, FTC 210 or financial institution 220 may provide a set of web services where each web service may correspond to an operation provided by the FTC 210 or financial institution 220 and may have a described interface such that a requestor may interact with the web service according to that interface. Specifically, a requestor may communicate a message (e.g. a web service call) to a service agent associated with the desired web service, where the message is in a format prescribe by the definition of the interface of the desired web service. In many cases, the definition of the interface describes the message formats, data types, transport protocols, etc. that are to be used between a requester and a service agent. The message may comprise data to be operated on by the requested web service. For example, the message may be a SOAP (e.g. Simple Object Access Protocol) message comprising one or more eXtensible Markup Language (XML) documents or the like.

Figure 3:
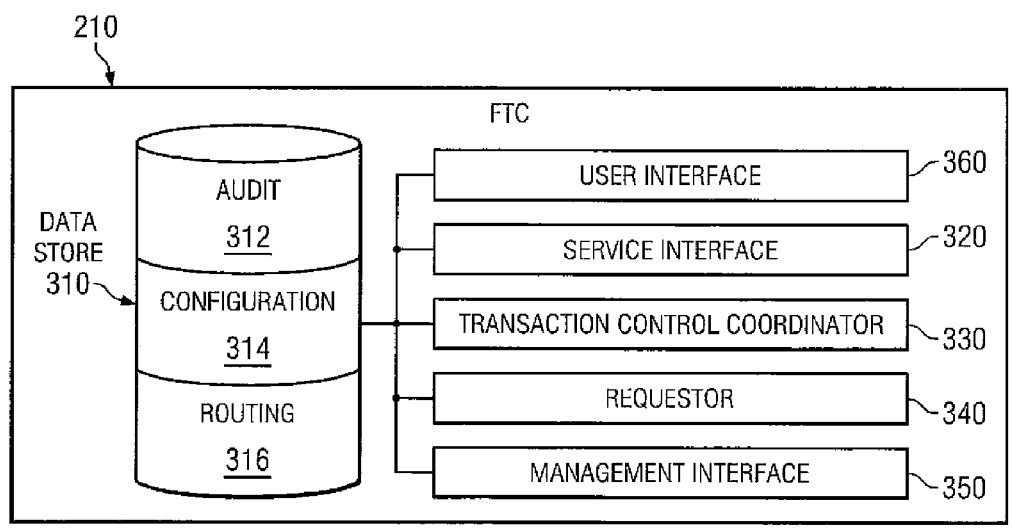
FIG. 3 is a block diagram illustrating one embodiment of a financial transaction center.

It may be helpful here to illustrate the architecture of the FTC and an individual financial institution in more detail. Referring first to FIG. 3, a block diagram of one embodiment of a FTC is depicted. For clarity, the one or more users at the computing devices and financial institutions are not shown, but are connected to the FTC 210 as previously described. Here, FTC 210 may include data store 310 which may comprise an audit database 312, a configuration database 314 and a routing database 316. The audit database may include a record of requests received or issued by FTC 210. This record may, in one embodiment, include related web service call data for a received or issued request or the actual requests themselves. The audit database may also include statistics on the usage of the FTC 210 (such as requests for the various services provided by the FTC 210, time/data of such requests, request originator, target and source IP of the request, time to complete the request, etc.) to allow reports to be generated or these statistics or statistics on the FTC 210 to be otherwise analyzed.

The routing database 316 may contain data utilized to make requests to various financial institutions and may include information utilized for the FTC 210 to issue a request to a particular financial institution as well as data to validate the identity of an issuer of a request received by the FTC 210 (e.g. a particular financial institution) to ensure that the requestor is authorized to make such a request. In one embodiment, routing data base 316 may comprise data structures which comprise an IP/host or a Uniform Resource Locator (URL) associated with each financial institution and may comprise such data with each a particular web service or web service interface provided by each financial institution (as will be discussed in more detail later). The configuration database 314 comprises data on the various functions of the applications or hardware which comprise the FTC 210 such that these may be tuned according to an owner's or operator's desires.

FTC 210 may also include a service interface 320, a transaction control coordinator 330, a requestor 340 and a management interface 350, of which at least a portion of the functionality may be implemented by one or more software applications executing on one or more computing devices or processors of, or operating in conjunction with, FTC 210 at one or multiple locations. Management interface 350 may provide the ability for a user or operator to configure the operation or FTC 210 (e.g. by setting one or more values in configuration database 314) remotely (at one or more of computing devices 260) using for example, a web based interface or the like or to directly configure FTC 210 by, for example, directly interacting with one or more computing devices which may be executing one or more programs which provide a portion of the functionality of the FTC. Such a management interface 350 may also allow the FTC 210 to be started, stopped, restarted, allow the registration of security keys (e.g. public keys) associated with financial institutions, manage or configure the routing tables or data structures in routing database 316 audit database 312 or any other types of configuration or management desired with respect to FTC 210. Management interface 350 may also comprise reporting functionality such that reports on various statistics or functioning associated with FTC 210 (e.g. which may be stored in audit database 312) may be generated.

Service interface 320 and user interface 360 may provide one or more interfaces for interaction with FTC 210. More specifically, service interface 312 may provide one or more interfaces which will allow requests for operations to be made to, or received at, FTC 210. Thus, a requestor such as an application at a financial institution may make a request to FTC 210 using the interface provided by service interface 320. As discussed above these interfaces may be provided as one or more web services. Similarly, user interface 360 may be provided in conjunction with FTC 210 such that a user (e.g. at a computing device 260) may directly interact with FTC 210 to initiate a transaction.

Transaction control coordinator 330 may comprise logic (e.g. a program, rule engine, set of instructions, workflow, etc.) operable to service the requests received through service interface 320 or transactions received through user interface 360, including determining one or more associated requests to issue to various financial institutions based upon the received request or transaction, where the determined requests may be different in function or number than the received request. These associated or determined requests may be issued to a particular financial institution through requester component 340, which may issue each of these requests to the corresponding financial institution, receive a response corresponding to the issued request and return the result(s) to the transaction control coordinator 330. Using the result(s) of the determined requests, the transaction control coordinator 330 may assemble a response to the received request according to the service interface 320, such that the service interface 320 may return this response to the originator of an initial request or assemble a response to the transaction such that the response may returned to the user through user interface 360.

Figure 4:
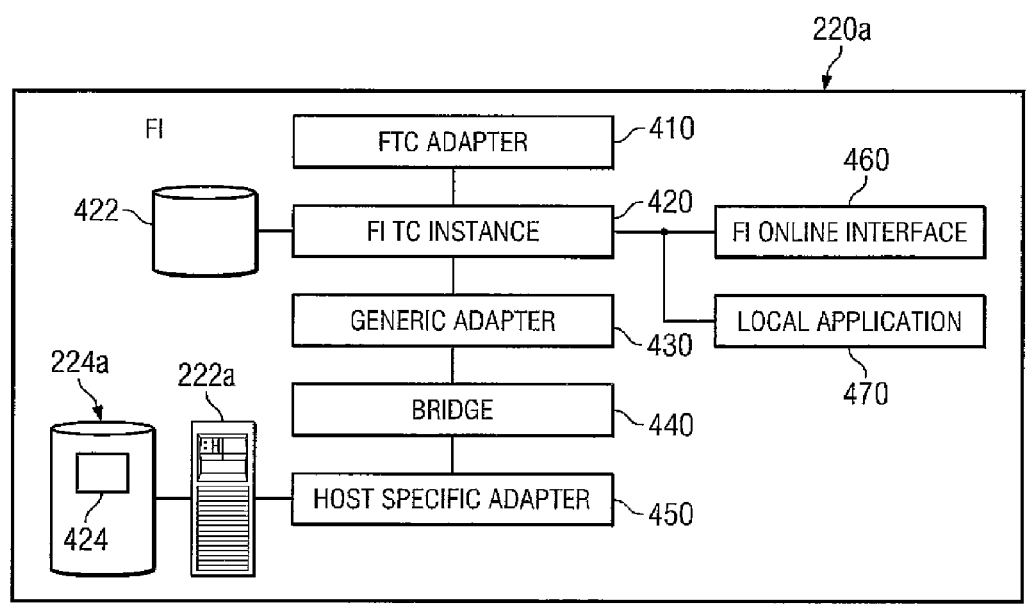
FIG. 4 is a block diagram illustrating one embodiment of a financial institution.

Moving now to FIG. 4, a block diagram of one embodiment of a financial institution is depicted. For clarity, the one or more users at the computing devices and the financial transaction center are not shown, but are connected to the FTC 210 as previously described. A financial institution (FI) 220a may be an organization associated with a particular American Banker's Association Routing Number (ABARN) and comprise corresponding host system 222a. A particular host system may operate according to a variety of platforms including UNISYS, AS/400, etc. to store account data and be operable to perform a variety of transactions with respect to data in associated data store 224a. In particular, this data may comprise data on accounts associated with the financial institution 220a (e.g. balances, transactions conducted with respect to the account, data on the holder of the account, etc.), where each account corresponds to a particular account number unique to that account at that financial institution 220a. Thus, a particular account may be identified utilizing the ABARN for that financial institution 220a and the account number. Transactions may be performed with respect to accounts within data store 224a utilizing host system 220a. One particular account held within host system 220a may be a settlement account 424 used to reconcile transfers or other operations between various accounts at different financial institutions.

Financial institution 220a may also comprise FTC FI data store 422, which may comprise information on users of financial transaction system 200 such as authentication information for such user's, accounts associated with the user's and the location of these accounts (e.g. an ABARN may be associated with each of a user's accounts). This user and account information may be determined utilizing almost any methods desired, such as requesting such having such information provided by, or collected from, a user or another data source.

In addition, financial institution 222a may comprise FTC adapter 410, a financial institution transaction coordinator instance (FITCI) 420, a generic adapter 430, a bridge 440, a host specific adapter 450, a local application 470 and an FI online interface 460 of which at least a portion of the functionality may be implemented by one or more software applications executing on one or more computing devices or processors of, or operating in conjunction with, FI 220 at one or multiple locations. FI online interface 460, local application 470 and FTC adapter 410 may provide for interaction with FITCI 420. More specifically, FTC adapter 410 may provide one or more interfaces which will allow requests to be made to, or received at, FI 220a. In particular, FTC adapter 410 may provide a set of interfaces which allow a requestor (such as requestor 340 at FTC 210) to make a request to FI 220a and have a result returned to the requestor. As discussed above, these interfaces may be provided as a web service, an API or some other format. This set of interfaces provided by FTC adapter 410 may be standardized across financial institutions 220, such that by providing an instance of FTC adapter 410 at each of financial institutions 220, the same set of services may be provided (e.g. the same type of requests may be issued to and responded to by) all financial institutions 220 and these services requested in the same manner (e.g. requests may issued to, and response received from) with respect to all financial institutions 220. FTC adapter 210 may also provide the ability to issue requests to FTC 210 and receive responses to these requests.

Figure 8:
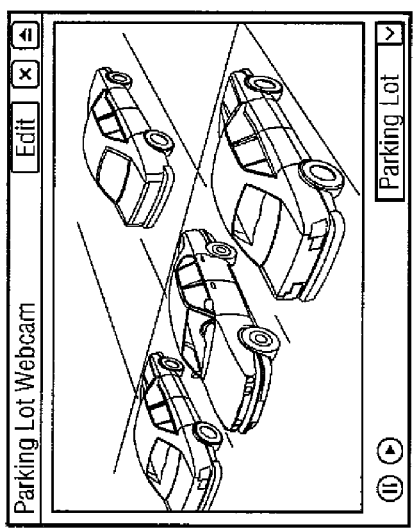
FIG. 8 is an illustration of one embodiment of an interface which may be utilized to conduct transactions.

Similarly, FI online interface 460 and local application 470 may be provided in conjunction with FI 220a such that a user (e.g. at a computing device 260) may directly interact with FTC 210 to initiate a transaction. An interface such as that provided by FI online interface 460 may be web page or the like, while the local application may be an application that is run internally to the financial institution 222a and may provide an interface to be utilized by employees of financial institution 220a (such as tellers, loan officers, etc.). One embodiment of an example of such an interface is depicted in FIG. 8.

FITCI 420 comprises logic operable to service requests received through FTC adapter 420 or transactions received through FI online interface 460 or local application 470, including determining one or more associated requests to issue to the FTC 210, or requests to issue to the host system 222a, based upon a received request or transaction or account data stored in FTC FI data store 422. Here, FITCI 420 may comprise logic operable to determine one or more associated requests to issue to FTC 210 or requests to issue to the host system 222a based upon the received transaction or request and the location of accounts associated with the request or transaction stored in FTC FI data store 422. Requests for the FTC 210 may be issued through FTC adapter 410 to FTC 210 based upon the service interface 320 provided by FTC 210, the response to the issued request received and returned to the FITCI 420.

Any determined requests that are to be issued to local host system 222a may be issued to host system 222a using an interface provided by generic adapter 430, such as an API or the like (as depicted in more detail in Appendix A). Calls to generic adapter 430 may be translated or mapped from the format of the generic interface provided by generic adapter 430 to a format compatible with the format utilized by the specific host system 222a corresponding to the particular financial institution 220a by bridge 440. Host specific data adapter 450 may take this data from bridge 440 and execute an appropriate call to host system 222a, which may involve the creation of a message according to a protocol or format utilized by host system 222a where the message corresponds to the request received through generic adapter 430. Since each host interface may be different, in one embodiment an abstraction method is used in which the host specific adapter 450 presents a consistent interface to the bridge 440, but a specific interface to the host system 222a, where the specific interface is tailored for that host system 222a. This allow other applications (e.g. FITCI 420, generic adapter 430, bridge 440, FTC adapter 410) to be designed in such a way that they need not have knowledge of differences between host communication protocols (TCP/IP socket methods vs. session emulation, for instance) or be required to perform any sort of data translation (to and from the host-specific message set).

Thus, data received back from the host system 222a in response to a request may be decoded by host specific adapter 450 and passed back to bridge 440 with an indicator of success or failure. The bridge 440, may in turn, map this received data back to the format corresponding to the interface provided by generic adapter 430 which returns a response to the FITCI 420. By providing a generic adapter 430, bridge 440 and host specific adapter 450, only the host specific adapter 450 may need to be suitable for a particular host system 222 corresponding to a particular FI 220, allowing components such as the generic adapter 430, FITCI 420, FTC adapter 410 or FI online interface 460 to be generic or similar across financial institutions 220 and thus a common set of requests or transaction to be implemented or provided by these components in conjunction with all financial institutions 220 without specific knowledge of the host system 222 utilized in conjunction with a particular financial institution.

Consequently, using the response to any requests issued to local host system 222a or FTC 210, FITCI 420 may assemble a response to the initial received request according to the service provided by FTC adapter 410 and return it through FTC adapter 410 to FTC 210 or may assemble a response such that the response can be presented to the user who initiated the transaction through FI online interface 460 or local application 470.

As can be seen from an overview of embodiments of the architecture of FTC 210 and associated financial institutions 220, each of the financial institutions 220 may provide a generic interface through which requests for operations may be issued with respect to accounts on a corresponding host system 222, these requests carried out and any results returned to the requestor. Similarly, FTC 210 may provide an interface through which a request for an operation may be issued with respect to a particular account, this request carried out and a response to the request including any desired results or information returned to the issuer of the request. Consequently, this architecture may be utilized to implement methods for conducting transactions across financial institutions 220 utilizing the interfaces provided by both FTC 210 and financial institutions 220.

Figure 5:
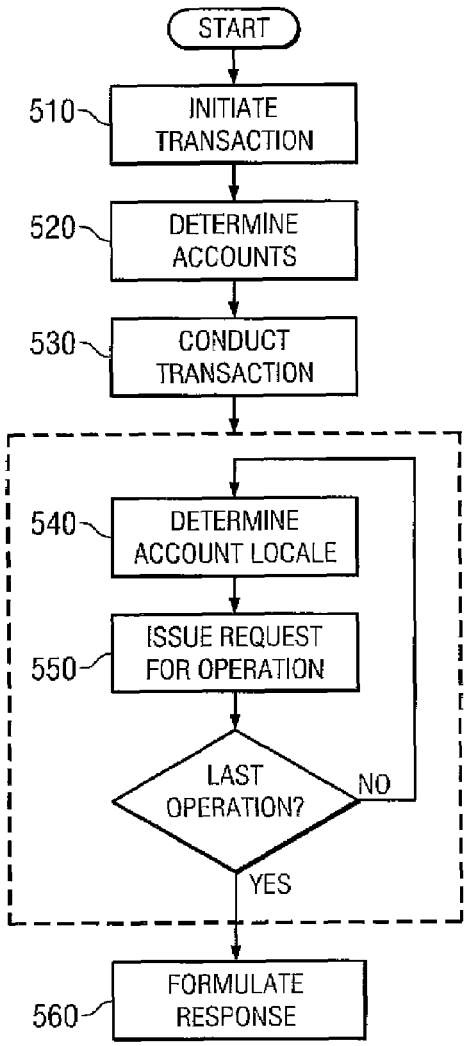
FIG. 5 is a flowchart illustrating one embodiment of a method for conducting a transaction.

A flow diagram of one embodiment of just such a method for implementing a cross financial institution transaction is depicted with respect to FIG. 5. At step 510 a transaction may be initiated by a user. The transaction may be initiated for example, using an interface provided by an FI online interface, which may be a web page that a user is interacting with on a computing device coupled to the financial institution by the Internet or another network. This transaction may involve, for example, one or more activities pertaining to one or more of the user's accounts, for example, checking balances on the accounts, transferring money between accounts, etc. These transactions may also be initiated by a teller interacting with local financial institution application directly. In other words, a user or account holder may specify that he wishes to conduct a certain transaction with respect to one or more accounts and the teller may initiate one or more transactions associated with the user specified transaction utilizing the local financial institution application.

Once a transaction has been initiated, at, or in conjunction with, a specific financial institution the accounts associated with the transaction and the user may be determined at step 520. These accounts may be specified in the transaction itself or may be determined with reference to the FTC FI data store located at the financial institution. As discussed above the FTC FI data store may comprise a set of users and a set of accounts associated with each user. Thus, utilizing an identifier associated with a user (e.g. the user's password or login information, social security number, etc.) which may be provided by the initiator of the transaction a user's accounts may be determined through access to the FTC FI data store associated with the financial institution.

Logic associated with the transaction may then be implemented at step 530 to conduct the transaction. More specifically, FITCI may comprise logic for conducting a set of transactions (e.g. a program, rule engine, set of instructions, workflow, etc.). This logic may then be implemented with respect to the transaction requested and the accounts determined above. More specifically, in one embodiment the logic may determine or include a set of operations which are to be performed on one or more of the accounts in order to implement the transaction. Thus, the FITCI may receive the request for a particular transaction and the associated accounts on which the transaction is to be performed (e.g. through the request for the transaction) and determine operations to be performed, where each of the operations may be associated with one or more accounts. Each of these operations may be dependent on one or more of the other operations (e.g. different operations may be conducted based upon the result of previous operation or may not be conducted at all), thus these operations may be conducted by the logic for the transaction as the operations are determined, after they all are determined or otherwise.

The logic may conduct the determined operations based upon the account(s) associated with the operation. Thus, for each operation it may be determined at step 540 if the account location is local or remote from the financial institution. This determination may be made using the ABARN associated with the account in the FTC FI data store. In other words if the ABARN corresponds to the FI at which the transaction was initiated the account may be considered a local account while if is does not correspond the account may be remote (i.e. located at another financial institution corresponding to the ABARN).

If the account is a local account, a request for the operation may be issued at step 550 using the generic adapter, such that the operation can be performed on the account using the host adapter of the financial institution. If, however, the account is a remote account a request for the operation on the account may be issued at step 550 to FTC 210 utilizing the service interface provided by the FTC. In one embodiment, the ABARN number associated with the account and the desired operation may be used to locate an address (e.g. URL, IP or other network location) where this operation may be requested (e.g. using a web service as described above). A request for this operation may then be issued utilizing this address (e.g. a web service for the desired operation on the desired account requested).

The next operation in accordance with the transaction may then be issued by the transaction logic of the FITCI. It will be noted that in certain cases operations issued by FITCI may be dependent on one another as discussed above, thus, in these cases, or others, the issuance of a request corresponding to an operation may depend upon receiving a result or status associated with a previously issued operation and thus FITCI may wait for such results or status before issuing a request for a succeeding operation or may determine a succeeding operation and corresponding request based upon such results or status.

Once all the operations associated with a particular transaction have been issued and any desired results received, at step 560 a response may be formulated for the initiator of the transaction. These results or any other information or status desired may then be communicated to a user at step 590 through, for example, the interface used to initiate the transaction.

Figure 6:
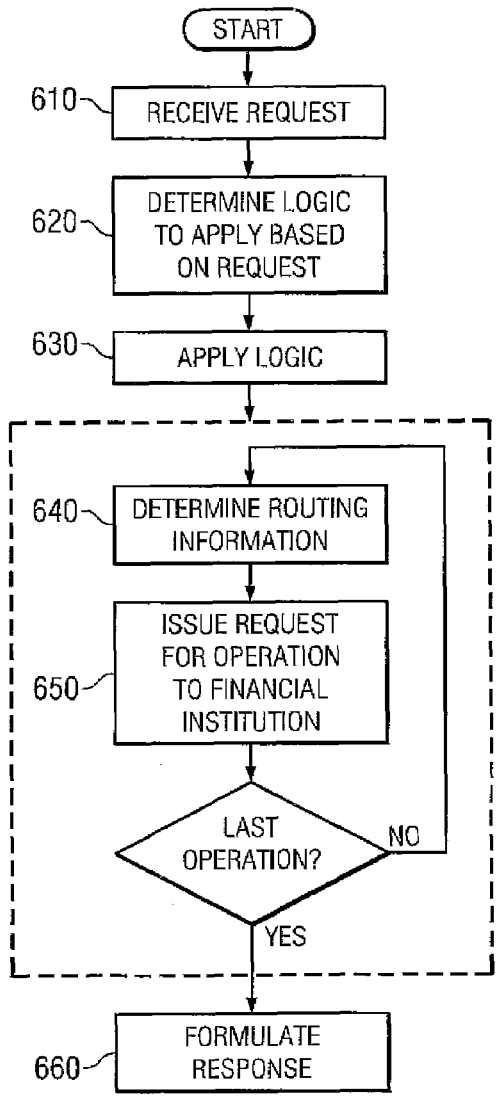
FIG. 6 is a flowchart illustrating one embodiment of a method for processing a request.

From a review of the embodiment for conducting transaction presented above it may be realized that operations desired to be performed on remote accounts are conducted by issuing requests to the FTC. Turning now to FIG. 6, one embodiment of processing these requests at the FTC is depicted. At step 610 a request for a particular operation on an account may be received at the FTC. This request may be received according to the interface provided by a service interface of the FTC and may be, for example, a request for a web service for performing the operation and may specify an account on which the operation is to be performed. These web services may provide the operations of, for example, checking a balance on the account, crediting an account, debiting an account, etc.

Logic associated with the received request may then be determined at step 620 and applied at step 630. In one embodiment, transaction control coordinator at FTC may comprise logic (e.g. a program, set of instructions, workflow, etc.). Based upon the request then (e.g. an operation associated with the request), the logic to apply in conjunction with the request may be determined by the transaction control coordinator. This logic may then be applied with respect to the account associated with the received request. More specifically, in one embodiment the logic may determine or include a set of operations which are to be performed in conjunction with account in order to implement the request. Each of these operations may be dependent on one or more of the other operations (e.g. different operations may be conducted based upon the result of previous operation or may not be conducted at all), thus these operations may be conducted by the logic of transaction control coordinator as the operations are determined, after they all are determined or otherwise.

Routing information corresponding to the operation desired may be determined at step 640. This routing information may be determined by first determining the financial institution associated with the account specified in the received request or associated with the operation using the ABARN number and accessing the routing database of the FTC to determine an address (e.g. IP/host or URL) associated with a web services corresponding both to the financial institution associated with the account and the operation desired. At step 650, then, a request for this operation may then be issued by the requestor of FTC to the financial institution holding the account utilizing this address (e.g. a web service for the desired operation on the desired account requested) according to the format of the FTC adapter associated with the financial institution.

The next operation in accordance with the received request may then be issued by the transaction control coordinator. It will be noted that in certain cases that requests issued by the transaction control coordinator may be dependent on one another as discussed above, thus, in certain cases the issuance of a particular request may depend upon receiving a result or status associated with a previously issued request and thus FITCI may, or may not, wait for such results or status before determining a succeeding operation.

Once all the operations determined in association with the received request have been issued as requests and any desired results received, a response may be formulated for the initiator of the received request at step 660. This response may be formulated according to the web service utilized to issue the originally received request and the response returned to the issuer of that original request.

Figure 7:
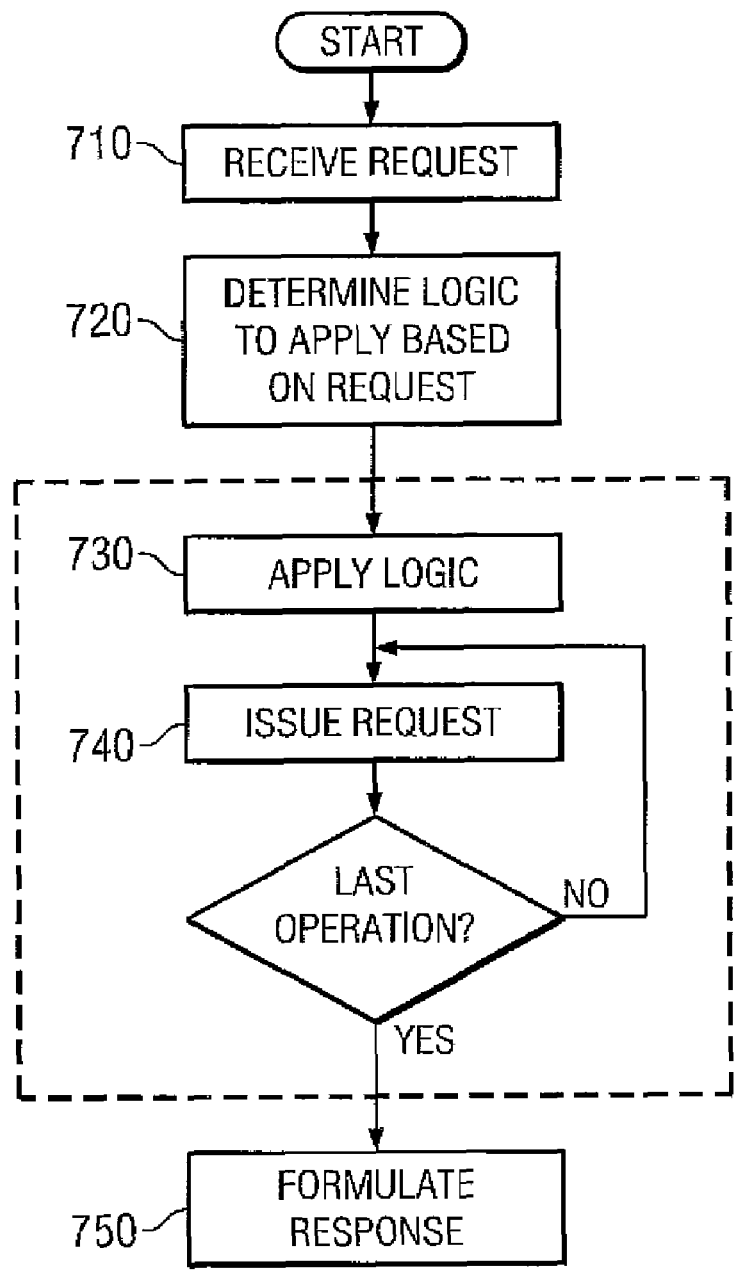
FIG. 7 is a flowchart illustrating one embodiment of a method for processing a request.

Reviewing the embodiment of servicing a request at the FTC presented above it will be noticed that servicing a request at the FTC may entail issuing one or more corresponding requests to a particular financial institution. Moving on to FIG. 7, one embodiment of processing these requests at a financial institution is depicted. At step 710 a request for a particular operation on an account may be received at a financial institution. This request may have been issued by a requestor at the FTC 210 in accordance with the processing of a request received by the FTC 210 and may be received or formatted according to the interface provided by the FTC adapter at the financial institution (which may in one embodiment be the same for every financial institution). The request may, for example, be a request for a web service for performing an operation and may specify an account on which the operation is to be performed. These web services may provide the operations of, for example, checking a balance on the account, crediting an account, debiting an account, etc.

Logic associated with the received request may then be determined at step 720 and applied at step 730. In one embodiment, FITCI comprises logic (e.g. a program, set of instructions, workflow, rules engine, etc.) for implementing operations associated with requests (e.g. a requested web service). Thus, the FITCI may receive a call from the FTC adapter for a particular operation on a particular account through an interface (e.g. an API) provided by the FITCI instance. Logic associated with the requested operation may then be determined and applied with respect to the account associated with received request.

More specifically, in one embodiment the logic may determine or include a set of operations which are to be performed on the account in order to implement the request. Each of these operations may be dependent on one or more of the other operations (e.g. different operations may be conducted based upon the result of previous operations or may not be conducted at all), thus these operations may be conducted by the logic of FITCI as the operations are determined, after they all are determined or otherwise.

Conducting an operation may comprise issuing a request for the operation to the generic adapter 430 using an interface (e.g. API) provided by the generic adapter at step 740. The next operation in accordance with the received request may then be issued by FTC FI instance at step 750. It will be noted that in certain cases that requests issued by the transaction control coordinator may be dependent on one another as discussed above, thus, in certain cases the issuance of a particular request may depend upon receiving a result or status associated with a previously issued request and thus FITCI instance may wait for such results or status before issuing a succeeding request.

Once all the operations associated with the received request have been issued and any desired results received a response may be formulated for the initiator of the received request (e.g. the requestor at the FTC). This response may be formulated according to the web service utilized to issue the received request and the response returned to the requestor.

It may be helpful to an understanding of embodiments presented herein to go through a few examples of conducting transactions with respect to financial transaction system. Suppose first that an account holder enters financial institution 220a and wishes to cash a check on an account at another financial institution 220b. Here a teller may use the local application at financial institution 220a to initiate a transaction to cash the check. First a request to the FTC 210 may be made to perform the operation of an inquiry on the account at financial institution 220b to ensure that sufficient funds to cover the check exist. If there are sufficient funds to cover the check (as determined from the response to the initial request) a request to the FTC 210 may be made to post a memo for the amount of the check against the account on which the check is to be drawn and a request made to credit the settlement account for the amount of the check at the financial institution 220a at which the check is being cashed.

Now suppose a user at a computing device 260 wishes to conduct an inquiry on his accounts which are held at financial institutions 220a and 220b. The user may login utilizing the online interface 460 at financial institution 220a and request information, such as a current balance on each of these accounts. For the local account a request for to obtain the current balance may be sent to the local host system 222a at financial institution 220a using the generic adapter 430. It may also be determined that another of the accounts on which a balance was requested by a user is remote from financial institution 220a. Thus a request to obtain a balance on this account may be sent to FTC 210. FTC 210 may determine the financial institution 220b associated with this account and issue a request to obtain the current balance to that financial institution 220b through the FTC adapter 410 at financial institution 220b. This request may be serviced and a response to the request comprising the balance from this account returned to FTC 210 from financial institution 220b. In turn, FTC 210 may provide a response to the initial request for an account balance issued by financial institution 220a, where the response contains the balance of the account at financial institution 220b. Using the balance obtained on the account local to financial institution 220a and the balance obtained on the account at remote financial institution 220b a response to the transaction initiated by the user may be formed (e.g. comprising the balance of both accounts) and returned to the user using online interface 460.

Similarly, suppose a user at a computing device 260 wishes to conduct a cross account transfer from an account held at financial institution 220b to an account held at financial institution 220a. The user may login utilizing the online interface 460 at financial institution 220a and request such a transfer. To conduct such a transaction it may be determined that the amount of the transfer should be debited from the account held at financial institution 220b and a request for such a debit operation may be made to FTC 210. FTC 210 may determine the financial institution 220b associated with this account and issue a request to debit the amount of the transfer from that account to the financial institution 220b through the FTC adapter 410 at financial institution 220b. Using the generic adapter at financial institution 220a, then a request may be made to credit the local account at financial institution 220a the amount of the transfer. This transfer may letter be reconciled using the settlement accounts at each of the financial institutions 220a, 220b. A response to the transaction initiated by the user may be formed (e.g. comprising an acknowledgement of the transfer) and returned to the user using online interface 460.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention and the disclosure herein, regardless of whether these modifications are discussed explicitly. For example, in one embodiment instead of initiating a transaction using an interface provided by a financial institution a user at a computing device may initiate a transaction using an interface provided by the financial transaction center, the financial transaction center may determine the operations to be conducted in association with this transaction and the financial centers associated with these operations, request these operations be performed at the respective financial institutions and provide a response to the user based upon responses received from the financial institutions.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

APPENDIX A

This appendix comprises one embodiment of calls which may be made to one embodiment of a generic adapter:

| Method Name | Input | Output |
| --- | --- | --- |
| HostGetAccountDetails (e.g. query for history and details on a specific account) | Account #, Product Code, PIN, InternalCIF | HostResponse |
| HostGetAccountList (e.g. list of accounts) | Reference to customer identity | AccountListResponse |
| HostGetAccountHistory (e.g. query for history and details on a specific account) | PIN, Account #, max transactions, from/to date | HostResponse |
| HostDoFundsTransfer (e.g. perform a funds transfer between accounts) | From Acct #, to Acct #, description, amount, currency code | HostResponse |
| HostProcessCheckReOrder (e.g. execute a check reorder) | Acct #, reference to customer identity, amount | CheckReOrderResponse |

What is claimed is:

1. A financial transaction system for conducting transactions across financial institutions, comprising:
   a set of financial institutions, each financial institution comprising:
      a host system;
      a first data store associated with the host system and comprising account information for that financial institution;
      a second data store comprising data on users of the financial transaction system;
      a financial transaction center adapter configured to receive a first request according to a first set of standardized interfaces, each of the first set of standardized interface associated with a set of first requests and further configured to assemble a first response for each of the set of first requests;
      a financial institution transaction coordinator instance configured to determine one or more second requests corresponding to the received first request;
      a host specific adapter tailored to the host system of the financial institution and operable to implement the one or more second requests in conjunction with the host system utilizing an interface tailored to the host system of the financial institution; and
   a financial transaction center coupled to each of the financial institutions, comprising:
      a service interface, configured to receive a second request from a first financial institution according to the first set of standardized interfaces associated with the first set of requests and further configured to provide a second response for each of the first set of requests;
      a transaction control coordinator, configured to determine one or more third requests corresponding to the second received request and a second financial institution associated with each of the third requests and assemble the second response for the first financial institution based on a response to the one or more third requests;
      a requestor configured to issue each of the third request to the associated financial institution; receive the response for each of the third requests from the associated financial institution.

2. The system of claim 1, wherein the first request and the second request correspond to a transaction initiated by a user at one of the financial institutions or the financial transaction center.

3. The system of claim 2, wherein the transaction involves a first account at the first financial institution and a second account a second financial institution.

4. The system of claim 3, wherein the user is not the owner of at least one of the first account or the second account.

5. The system of claim 3, wherein the first data store comprises a settlement account associated with the financial institution to be utilized in conjunction with transactions conducted between the set of financial institutions in the financial transaction network.

6. The system of claim 5, wherein the transaction is settled between the first financial institution and the second financial institution within the financial transaction system using a first settlement account at the first financial institution and a second settlement account at the second financial institution.

7. The system of claim 6, wherein the financial transaction center comprises a third data store including routing data, wherein the routing data comprises a set of resource locators, each resource location associated with one of the first set of standardized interfaces and a particular financial institution.

8. The system of claim 7, wherein each of the third requests corresponds to one the set of resource locators.

9. The system of claim 8, wherein the second request received at the financial transaction center is associated with an account and the transaction control coordinator is configured to determine a financial institution associated with the account and the resource locator corresponding to each of the third requests based on the determined financial institution using the routing data.

10. The system of claim 9, wherein the first set of standardized interfaces are web service interfaces.

11. A method for conducting transactions across financial institutions, comprising:
providing a financial transaction system coupled to each of a set of financial institutions, each financial institution comprising a host system, a first data store associated with the host system comprising account information for that financial institution and a second data store comprising data on users of the financial transaction system;
receiving an transaction initiated by a user;
receiving, at the financial transaction center, a first request from a first financial institution according to a first set of standardized interfaces associated with a first set of requests;
determining one or more second requests corresponding to the first received request and a second financial institution associated with each of the second requests wherein the one or more second requests are determined by a transaction control coordinator at the financial transaction center;
issuing each of the second requests to the associated second financial institution, wherein each of the second requests is issued by a requestor at the financial transaction center;
receiving, at a financial transaction center adapter at one of the second financial institutions, one of the second requests according to the first set of standardized interfaces, each of the first set of standardized interface associated with the set of first requests;
determining one or more third requests corresponding to the received second request wherein the one or more third requests are determined by a financial institution transaction coordinator instance at the second financial institution;
implementing the one or more third requests in conjunction with a host system of the second financial institution utilizing an interface tailored to the host system of the second financial institution wherein the one or more third requests are implemented by a host specific adapter tailored to the host system of the second financial institution;
assembling, at the second financial institution, a first response for the received second request;
receiving, at the financial transaction center, the first response from the second financial institution; and
assembling a second response for the first financial institution based on the first response received from the second financial institution, wherein the second response is assembled by the transaction control coordinator.

12. The method of claim 11, wherein the first request and the second request correspond to the transaction initiated by a user at one of the financial institutions or the financial transaction center.

13. The method of claim 12, wherein the transaction involves a first account at the first financial institution and a second account at the second financial institution.

14. The method of claim 13, wherein the user is not the owner of at least one of the first account or the second account.

15. The method of claim 13, wherein the first data store comprises a settlement account associated with the financial institution to be utilized in conjunction with transactions conducted between the set of financial institutions in the financial transaction network.

16. The method of claim 15, wherein the transaction is settled between the first financial institution and the second financial institution within the financial transaction system using a first settlement account at the first financial institution and a second settlement account at the second financial institution.

17. The method of claim 16, wherein the financial transaction center comprises a third data store including routing data, wherein the routing data comprises a set of resource locators, each resource location associated with one of the first set of standardized interfaces and a particular financial institution.

18. The method of claim 17, wherein each of the second requests corresponds to one the set of resource locators.

19. The method of claim 18, wherein the first request received at the financial transaction center is associated with the second account and the transaction control coordinator is configured to determine the second financial institution associated with the second account and the resource locator corresponding to the second request based on the second financial institution using the routing data.

20. The method of claim 19, wherein the first set of standardized interfaces are web service interfaces.

* * * * *